United States Patent
Abatzoglou et al.

(10) Patent No.: US 7,301,495 B2
(45) Date of Patent: Nov. 27, 2007

(54) INTERRUPT SAR IMPLEMENTATION FOR RANGE MIGRATION (RMA) PROCESSING

(75) Inventors: Theagenis John Abatzoglou, Huntington Beach, CA (US); Leo H. Hui, Alhambra, CA (US); Kwang M. Cho, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 59 days.

(21) Appl. No.: 11/329,764

(22) Filed: Jan. 11, 2006

(65) Prior Publication Data

US 2007/0159376 A1    Jul. 12, 2007

(51) Int. Cl.
*G01S 13/90* (2006.01)
*G01S 13/89* (2006.01)
*G01S 13/00* (2006.01)

(52) U.S. Cl. .......... 342/25 F; 342/25 R; 342/25 A; 342/89; 342/90; 342/175; 342/176; 342/179; 342/192; 342/195; 342/196

(58) Field of Classification Search .......... 342/21, 342/25 R–25 F, 59, 89, 90, 159, 175, 176, 342/179, 189–197
See application file for complete search history.

(56) References Cited

U.S. PATENT DOCUMENTS

| | | | | |
|---|---|---|---|---|
| 5,945,940 A | * | 8/1999 | Cuomo | 342/90 |
| 7,006,031 B1 | * | 2/2006 | Abatzoglou et al. | 342/25 A |
| 7,145,496 B2 | * | 12/2006 | Cho et al. | 342/25 R |
| 7,242,342 B2 | * | 7/2007 | Wu et al. | 342/25 C |

OTHER PUBLICATIONS

T.G. Moore et al, "Enhanced Imagery Using Spectral-Estimation-Based Techniques"; Lincoln Laboratory Journal; vol. 10, No. 2; 1997.*
J. Salzman et al, "Interrupted Synthetic Aperture Radar (SAR)"; Proceedings of the 2001 IEEE Radar Conference; pp. 117-122; May 1-3, 2001; IEEE Publication 0-7803-6707-3/01/$10.00.*
J. Salzman et al, "Interrupted Synthetic Aperture Radar (SAR)"; IEEE AESS Systems Magazine; vol. 17, issue 5; May 2002; pp. 33-39.*
X.J. Xu et al, "SAR/ISAR Imagery from Gapped Data: Maximum or Minimum Entropy?"; "Antennas and Propagation Society International Symposium, 2005 IEEE" proceedings; vol. 2A; pp. 668-671; Jul. 3-8, 2005.*

* cited by examiner

*Primary Examiner*—Bernarr E. Gregory
(74) *Attorney, Agent, or Firm*—Leonard A. Alkov

(57) ABSTRACT

A moving radar (405) generates a synthetic aperture image from an incomplete sequence of periodic pulse returns. The incomplete sequence of periodic pulse returns has one or more missing pulses. The radar converts the incomplete sequence of pulse returns into a digital stream. A computer (403) processes the digital stream by computing an along track Fourier transform (402), a range compression (408), an azimuth deskew (410) and an image restoration and auto focus (412). The image restoration and autofocus (412) utilizes a low order autofocus (501), a gap interpolation using a Burg algorithm (503), and a high order autofocus (505) for generating an interpolated sequence. The interpolated sequence contains a complete sequence of periodic pulse returns with uniform spacing for generating the synthetic aperture image. The image restoration and autofocus (412) computes a linear prediction coefficients estimate using the Burg Algorithm (606). The linear prediction coefficients estimate (606) is used to compute a weighted forward-backward interpolation to generate the complete sequence of periodic pulse returns (608).

12 Claims, 6 Drawing Sheets

INTERRUPT SAR IMPLEMENTATION FOR RANGE MIGRATION (RMA) PROCESSING

This invention was made with Government support under Contract No. F19628-00-C-0100 awarded by the Department of the Air Force. The Government has certain rights in this invention.

BACKGROUND OF THE INVENTION

1. Field of the Invention

This invention is in the field of Synthetic Aperture Radar (SAR) imaging where missing pulses are encountered.

2. Description of the Related Art

Synthetic Aperture Radar (SAR) is used for ground mapping as well as target identification. The general principle behind SAR is to coherently combine the amplitude and phase information of radar returns from a continuous sequence of transmitted pulses. These transmitted pulses are from a relatively small antenna on a moving platform. As the platform moves, the information reflected from the sequence of pulses is coherently combined to arrive at a high resolution SAR image.

The plurality of sequential returns creating a SAR image generated by the transmitted pulses along a presumed known path of the platform make up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The clarity of a SAR image is in many respects dependent on the quality of the motion compensation applied to each radar return prior to SAR image computation. Motion compensation shifts the phase of each radar sample (typically an I+jQ complex quantity derived from an analog to digital converter) in accordance with the motion in space of the moving platform with respect to a reference point. The SAR imaging process depends on the coherent, phase accurate summing of the sequence of ALL radar returns expected within an array. These principles are detailed by W. G. Carrara, R. S. Goodman and R. M. Majewski in *Spotlight Synthetic Radar*, Boston, Artech House, 1995.

In addition to the spotlight mode, SAR radar can also be operated in the search (swath or strip) map mode. Spotlight mode produces two dimensional images of limited size of a limited area by steering the antenna beam to the center of the map (image) center for the duration of a frame (or array). Conversely, search mode produces image strips of theoretically unlimited length by maintaining a fixed azimuth antenna orientation during a SAR-data collection period, or array. Unlike spotlight mode that typically produces images oriented in the range-azimuth direction, search mode produces images oriented in the along track and cross track direction. Uncompensated platform motion during SAR mode results in image smearing in the azimuth direction caused by pulse data that affects azimuth response.

Another difficulty presented during SAR mode comes from incomplete arrays. That is, a number of radar pulse returns forming the required sequence of returns in an array may be missing. The missing pulses may arise because of multi-mode operation wherein a different mode is entered during an array. The missing pulses within the partial array blur the resulting SAR image, obfuscating details thus rendering it of limited utility, necessitating restoration of the missing pulse returns.

SUMMARY OF THE INVENTION

Above limitations are reduced and SAR images are improved by a moving radar generating a synthetic aperture image from an incomplete sequence of periodic pulse returns. The incomplete sequence of periodic pulse returns has one or more missing pulses. The synthetic aperture image contains scatterers. The radar converts the incomplete sequence of pulse returns into a digital stream. A computer processes the digital stream by computing an along track Fourier transform, a range compression, an azimuth deskew and an image restoration and auto focus. The image restoration and autofocus utilizes a low order autofocus, a gap interpolation using a Burg algorithm, and a high order autofocus for generating an interpolated sequence. The interpolated sequence contains a complete sequence of periodic pulse returns with uniform spacing for generating the synthetic aperture image. The image restoration and autofocus computes a linear prediction coefficients estimate using the Burg Algorithm. The linear prediction coefficients estimate is used to compute a weighted forward-backward interpolation to generate the complete sequence of periodic pulse returns.

The gap interpolation using a Burg algorithm computes:
a selection of non-interrupted pulse intervals,
a model order selector estimate of number of said scatterers,
a linear prediction coefficients estimate,
a weighted forward-backward interpolation using said linear prediction coefficients estimate,
a model order selector, and
a Forward-Backward extrapolation to the original aperture using a Burg method.

The image restoration and autofocus computes a selection of non-interrupted pulse intervals as well as a model order selector estimate of number of said scatterers in each range bin. The image restoration and autofocus also computes a linear prediction coefficients estimate using the Burg Algorithm. The linear prediction coefficients estimate is used to compute a weighted forward-backward interpolation to generate said complete sequence of periodic pulse returns.

DETAILED DESCRIPTION OF THE INVENTION

The present invention describes a method for improving search type SAR images of a patch where missing pulses within an incomplete array are restored using information contained in the incomplete array.

1) Introduction

SAR images require a complete (full) array of reflected pulse returns to generate the SAR image. Each of the returns from the reflected pulses are also accurately phase aligned, to achieve the in-phase combination of the information contained therein. SAR image degradation, typically due to phase errors arise from many sources. One source of such errors is navigation data inaccuracies from motion compensation, or from atmospheric effects on radar returns. Another is pulse interrupts (missing pulses) within an incomplete array.

Pulse interrupts in an incomplete SAR array raise the sidelobe level of a SAR image by as much as 20 dB, impacting the quality of the SAR image by a significant amount. One approach towards filling in the interrupts is described in the application titled *Interrupt SAR Image Restoration Using Linear Prediction and Range Migration Algorithm (RMA) Processing*, Ser. No. 10/968,780, filed Oct. 19, 2004 (PD-03W155), now U.S Pat. No. 7,006,031 incorporated herein in its entirety by reference. The method used is to fill in the missing pulses by a signal processing approach for correcting the effects of missing samples in the phase history of an incomplete SAR array in the case where the Range Migration Algorithm (RMA) is used. The method handles both the spot and search case in a similar fashion. An application of the Azimuth deskew algorithm insures the range compressed samples are aligned in K, before the interpolation process takes place.

A fast implementation of this algorithm was proposed using a sub-band decomposition of the range compressed samples. While this approach is relatively efficient, it is desirable to further reduce execution time for the proposed interrupt fill algorithm in a typical state of the art radar processor.

In contrast to previous approaches, to further speed computation, the present application describes a method for interrupt SAR image restoration that is based on the Burg algorithm. The computational load of the Burg algorithm to estimate the linear prediction coefficients is one order of magnitude (factor of ten) less than that required by Modified Forward-Backward Linear Prediction (MFBLP) techniques. Further experiments with radar data show the Burg algorithm described herein performs similarly to the MFBLP in restoring SAR images which have been corrupted due to pulse interrupts.

Figure 1:
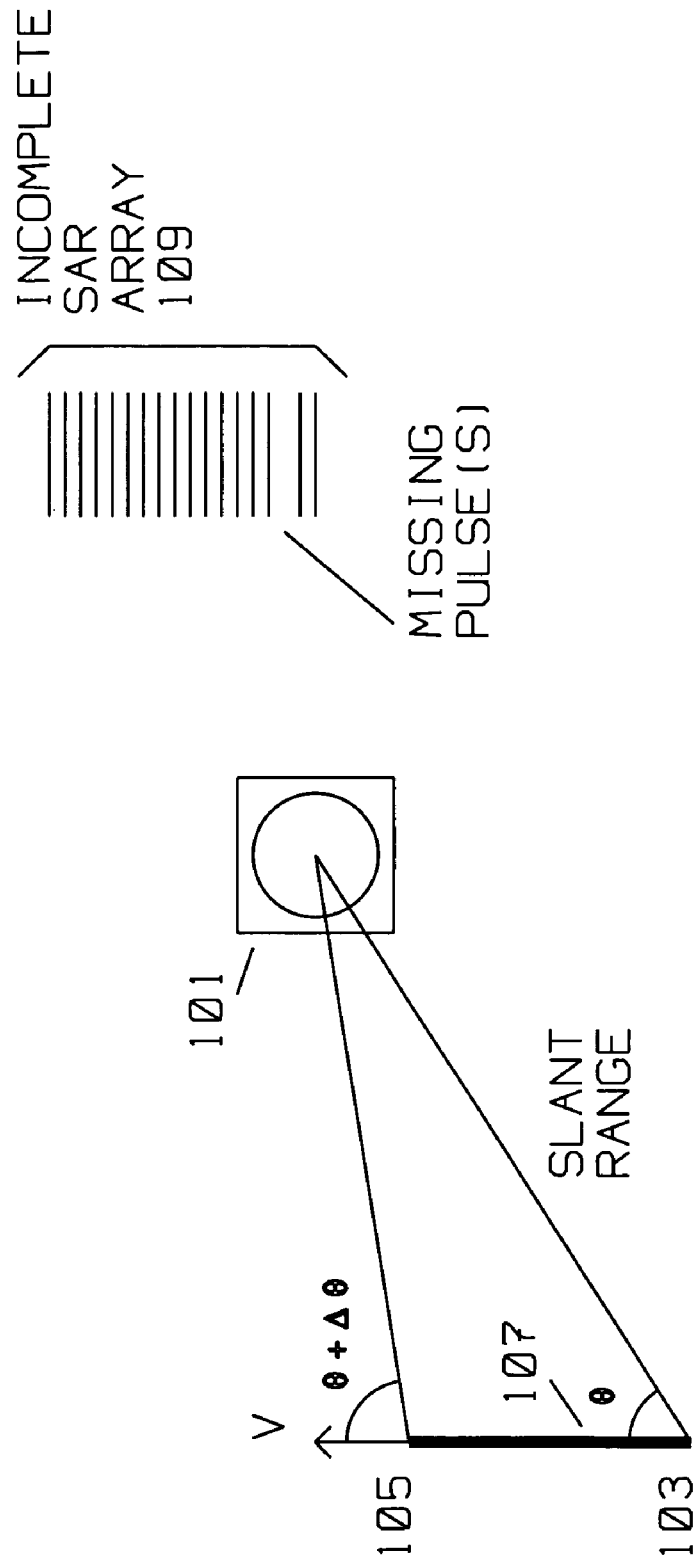
FIG. 1 is a SAR swath configuration of the prior art

FIG. 1 shows the typical prior art geometric relationship between a moving platform carrying a radar transmitter/receiver using Synthetic Aperture (SAR) spot search methods imaging patch 101 by said radar transmitter/receiver. The moving platform is initially at position 103, travels along a rectilinear path 107 with velocity V to position 105. In SAR spot mode applicable in this description, the SAR antenna azimuth is variable at azimuth angle θ to θ+Δθ oriented towards patch 101 as the platform moves with velocity V. The moving platform moves from position 103 to position 105 along path 107, so that the antenna illuminates patch 101 as it progresses. Radar pulses are transmitted and corresponding returns received at many points during the incomplete array 109 collected between position 103 and position 105. Typically, a complete array has $2^n$ pulses such as 256, 512, 1024, 2048, for compatibility with the FFT. An incomplete SAR array 109 has one or more missing pulses to be filled in accordance with the present teachings. The search types of SAR radar are well known in the art and are described, for example, by J. C. Curlander, et al, in *Synthetic Aperture Radar: Systems and Processing*, Wiley, 1991, incorporated herein be reference in its entirety.

Figure 2:
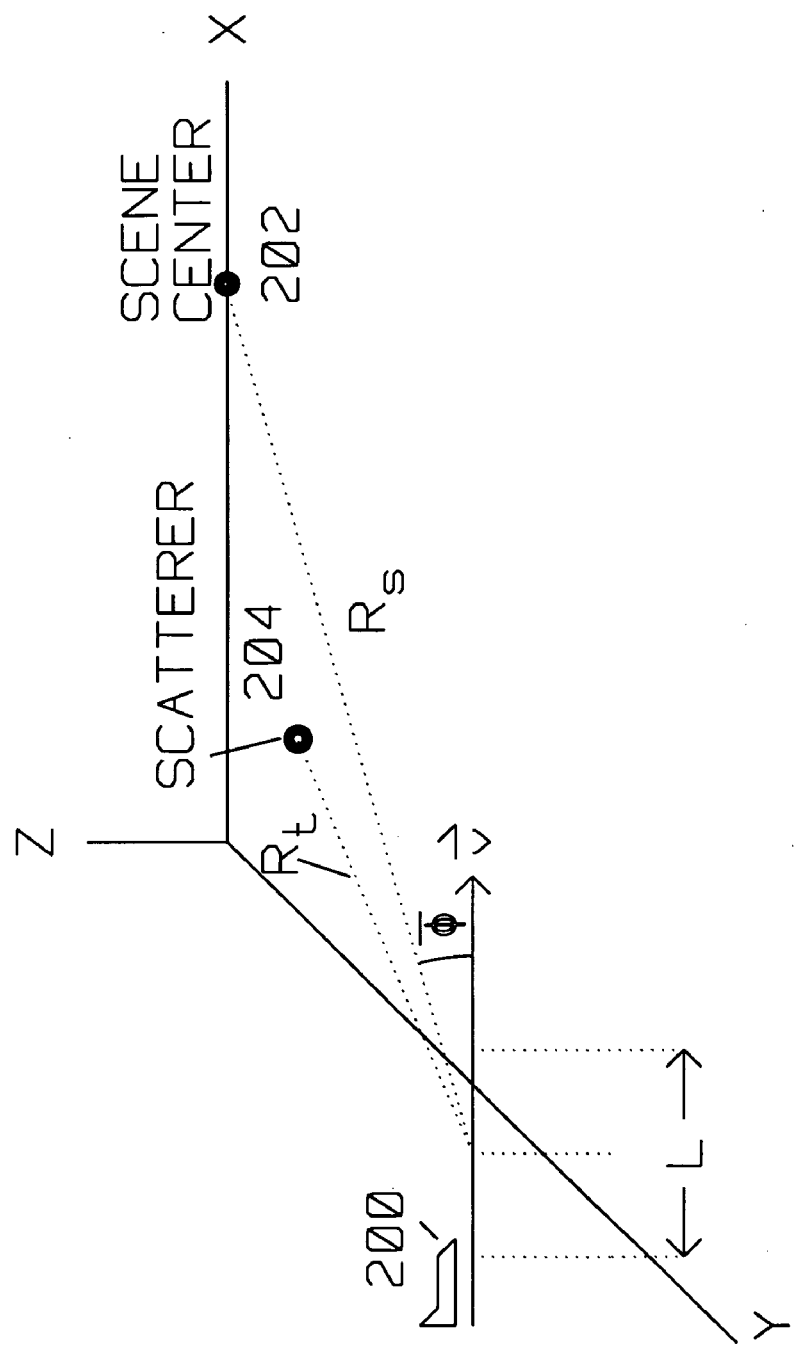
FIG. 2 shows the geometry of SAR aperture and scatterers applicable to the present disclosure.

FIG. 2 shows the geometry and coordinates used in the RMA and processed using the method herein. The radar platform 200, typically an aircraft, is moving along the x-axis, with velocity $\vec{v}$ covering an aperture (array) of length L. The instantaneous position of the antenna phase center (moving along X) is $(x, y_{ac}, z_{ac})$ and the location of a scatterer 204 is $(x_t, y_t, z_t)$. The scene center 202 provides a reference for $\bar{\phi}$.

$R_s$ is the distance from the antenna phase center to the scene center 202 (reference line) on the ground.

After range deskew and motion compensation with respect to a reference line on the ground, the return from the scatterer is modeled, for the spot mode case, as $$s(x, K_R) = a_t p(x) e^{-j2\pi K_R (R_t - R_s + x \cos \bar{\phi})}$$

Where $a_t$ is the complex scatterer amplitude;

p(x) is the pulse interrupt indicator, 1 if pulse is not interrupted and 0 if the pulse is interrupted;

$K_R = 4\pi/\lambda$ is the spatial radial frequency, more detailed as:

$$K_R = \frac{4\pi}{c}\left(f_c + \gamma\left(\hat{t} - \frac{2R_s}{c}\right)\right)$$

$f_c$=RF center frequency;
γ=chirp slope of transmitted pulse;
$\hat{t}$=fast-time;
$R_s$=range to scene center from radar platform;

$$R_t = \sqrt{(x - R_s \cos\bar{\phi} x_t)^2 + (R_s \sin\bar{\phi} + y_t)^2}$$

$\bar{\phi}$ is the Doppler cone angle between the radar velocity vector $\vec{v}$ and the line connecting the center of aperture with the scene center 202.

The geometry is shown in FIG. 2. Scatterer 204 is located a distance $R_t$ from the center of the collected SAR array of length L. The scene center 202 is located a distance $R_s$ from the center of the collected array. $\vec{v}$ is parallel to the X coordinate axis, at an altitude along the Z coordinate axis.

Spot Mode Analysis.

Figure 3:
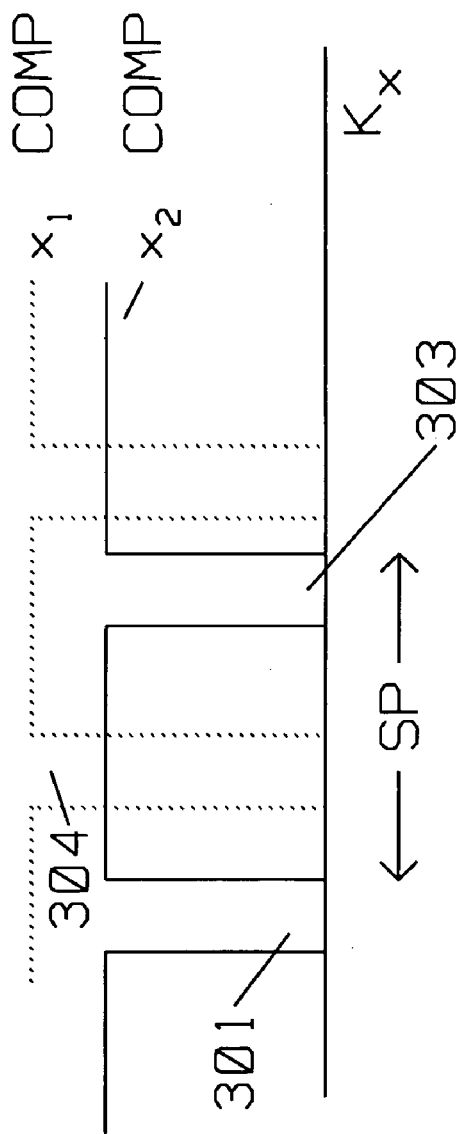
FIG. 3 shows the shift in along track Fourier transform response in the presence of interrupts (missing pulses)

After range deskew, scatterers are illuminated simultaneously by the antenna and thus interrupts are synchronous in time for all scatterers. However, after the Along Track Fourier transform, scatterers will appear shifted in spatial frequency $K_x$ in proportion to its x-coordinate as shown in FIG. 3. In FIG. 3, interrupts 301 and 303 are in the pulse trains associated with scatterer 2: $x_2$ component. Similarly, interrupt 304 is associated with scatterer 1: $x_1$ component. The spacing SP is $$SP = \frac{K_Y}{R_B}(x_2 - x_1)$$

Interrupts will also exhibit the same shift. Continue with the remainder of the RMA After the Stolt interpolation and Azimuth deskew the return from a scatterer will be:

$$a'_t p\left(-\cos\bar{\phi} y_{st} - \frac{R_s + y_{st}}{\sin\bar{\phi}} \frac{\tilde{K}_X}{\tilde{K}_Y}\right) e^{2\pi j(\tilde{K}_X x_{st} + \tilde{K}_Y y_{st})}$$

where $x_{st}$, $y_{st}$ and $\tilde{K}_X$, $\tilde{K}_Y$ are the rotated x-y and $K_X$, $K_Y$ spatial frequency coordinates with respect to range-azimuth.

Namely $$\begin{pmatrix} x_{st} \\ y_{st} \end{pmatrix} = \begin{bmatrix} \sin\bar{\phi} & -\cos\bar{\phi} \\ \cos\bar{\phi} & \sin\bar{\phi} \end{bmatrix} \begin{pmatrix} x_t \\ y_t \end{pmatrix}$$

and $$\begin{pmatrix} \tilde{K}_X \\ \tilde{K}_Y \end{pmatrix} = \begin{bmatrix} \sin\bar{\phi} & -\cos\bar{\phi} \\ \cos\bar{\phi} & \sin\bar{\phi} \end{bmatrix} \begin{pmatrix} K_{SX} \\ K_{SY} \end{pmatrix}$$

$$K_{SX} = K_R \cos\bar{\phi} + K_X; K_{SY} = \sqrt{K_R^2 - K_{SX}^2}$$

Next, determine the effect and position of the interrupts on the processor coordinates.

Assume there is an interrupt at $x=x_i$ in the along track position of the radar, then the interrupt manifests itself at:

$$-\cos\bar{\phi} y_{st} - \frac{R_s + y_{st}}{\sin\bar{\phi}} \frac{\tilde{K}_X}{\tilde{K}_y} = x_i$$

If we think of $\tilde{K}_X$ as a function of $x_i$ and $\tilde{K}_Y$ we obtain $$\tilde{K}_{X_i} = -\frac{\sin\bar{\phi}(x_i + \cos\bar{\phi} y_{st})}{R_s + y_{st}} \tilde{K}_Y$$

The effect of this interrupt on the spatial frequency $\tilde{K}_X$ extends from $$\tilde{K}_{X_i,start} = -\frac{\sin\bar{\phi}(x_i + \cos\bar{\phi} y_{st})}{R_s + y_{st}} \tilde{K}_{Y,low}$$

to $$\tilde{K}_{X_i,end} = -\frac{\sin\bar{\phi}(x_i + \cos\bar{\phi} y_{st})}{R_s + y_{st}} \tilde{K}_{Y,high}$$

Since an interrupt starts at $x=x_i$ and lasts until $x=x_i+\Delta x_i$ its effects will extend from $$\tilde{K}_{X_i,start} = -\frac{\sin\bar{\phi}(x_i + \cos\bar{\phi} y_{st})}{R_s + y_{st}} \tilde{K}_{Y,low}$$

to $$\tilde{K}_{X_i+\Delta x_i,end} = -\frac{\sin\bar{\phi}(x_i + \Delta x_i + \cos\bar{\phi} y_{st})}{R_s + y_{st}} \tilde{K}_{Y,high}$$

These intervals are avoided when processing the interrupted SAR data as not to distort the quality of the processing. The remaining non-interrupted intervals will be used in the subsequent processing to interpolate the gaps in the data. Typically, the height of the rectangles of uninterrupted data thins towards the boundaries of $\tilde{K}_x$. This is due to the radial nature of the pulse interrupts in the processor space. After range compression, the image restoration process is decomposed into a low order autofocus (typically $4^{th}$ order), a gap interpolation algorithm followed by a high order autofocus. The reason for this is that the low order autofocus is not distorted by the gaps (interrupts) along $\tilde{K}_x$, while a high order one may be subject to significant phase error biases due to the gaps (interrupts).

Figure 4:
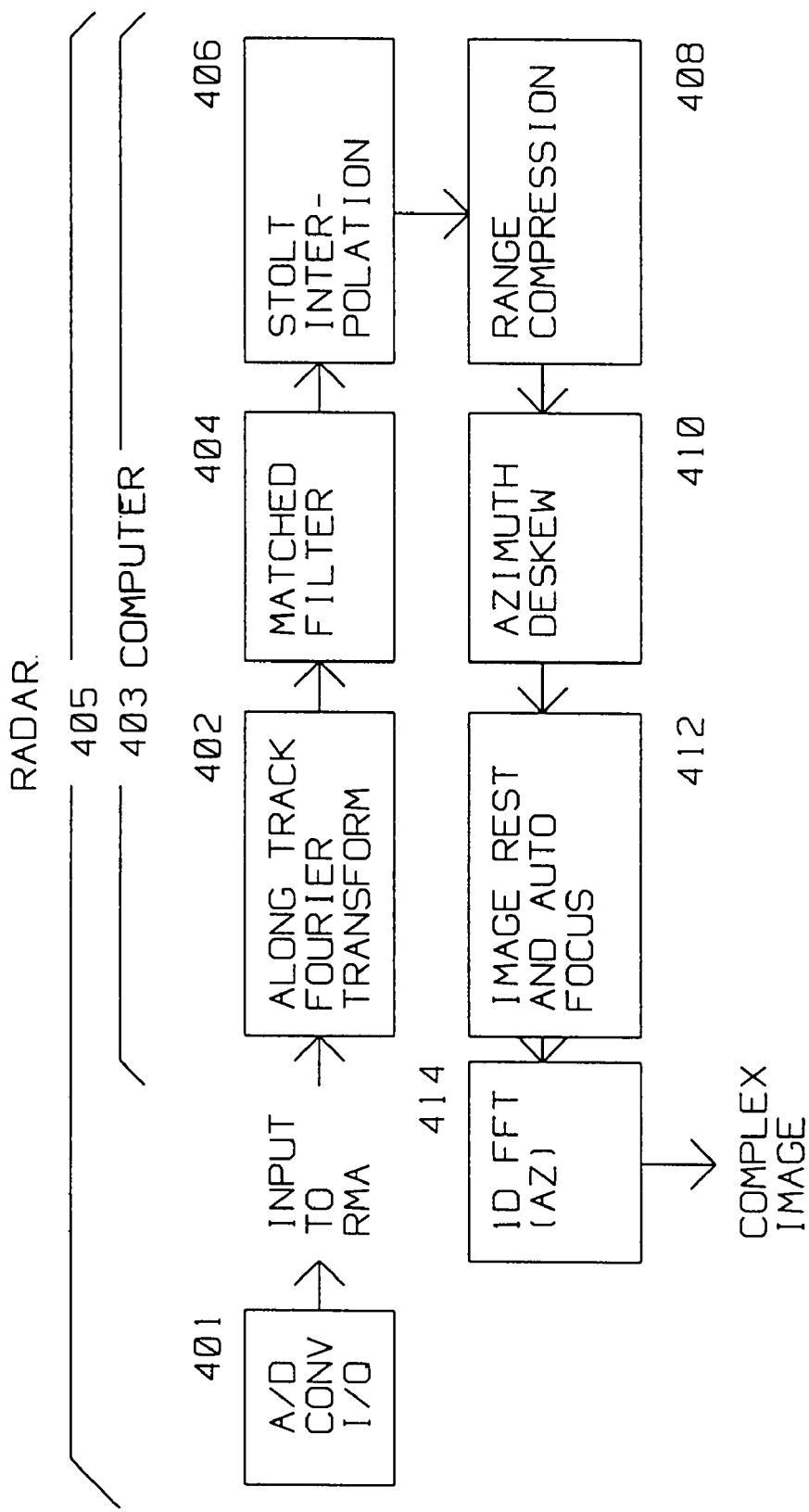
FIG. 4 shows the overview of a radar illustrating radar apparatus units/structural elements for processing the SAR interrupt interpolation method described herein.
Figure 5:
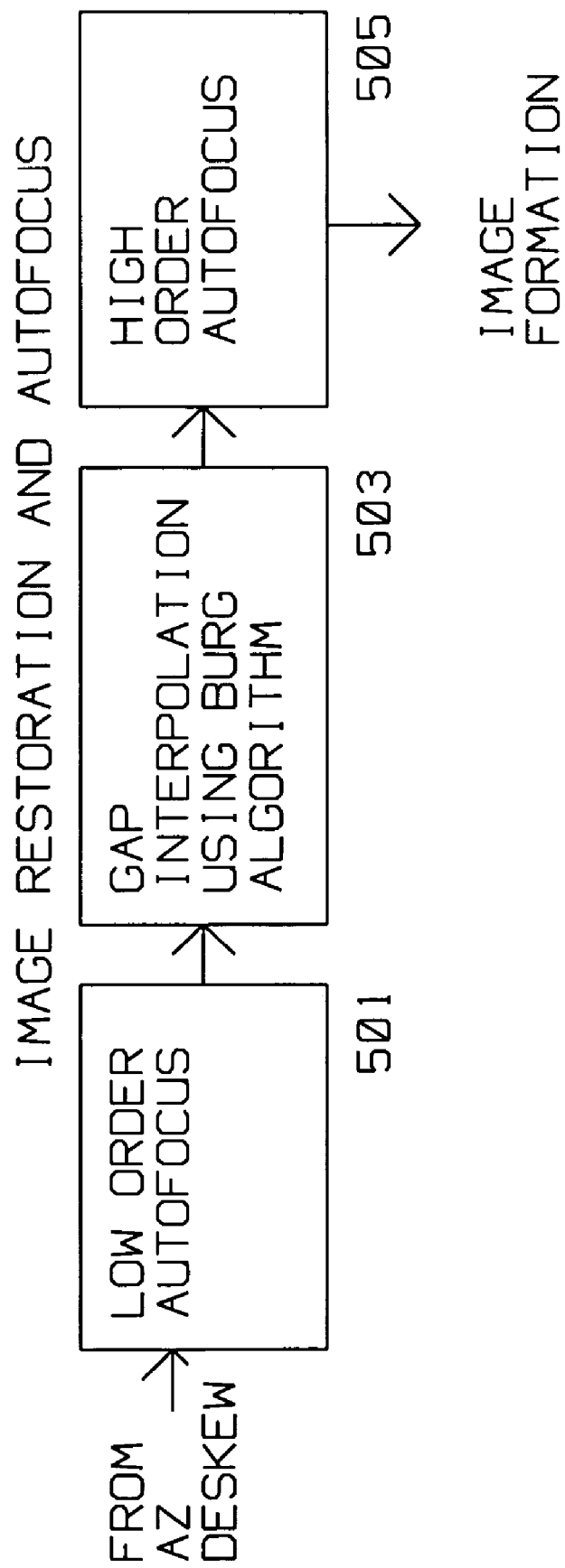
FIG. 5 summarizes the image restoration and autofocus portion of the interrupt interpolation method described herein.

A block diagram describing the overall apparatus and method for SAR image generation appears in FIG. 4, while FIG. 5 summarizes the image restoration interplay between autofocus and gap interpolation. Any autofocus algorithm minimally sensitive to missing data may be used. For example, use the autofocus algorithm called Successive Parameter Adjustment for Contrast Optimization (SPA) which is efficient for phase correction even if the ground returns are clutter dominated, as described in U.S. Pat. No. 7,145,496, titled *Autofocus Method Based on Successive Parameter Adjustments for Contrast Optimization,* issued Dec. 5, 2006.

In FIG. 4, the radar returns within radar 405 are digitized by A/D converter 401 to generate I/Q complex samples. The complex samples are input to computer 403 and processed to become the "input to RMA". The "input to RMA" is processed by Along Track Fourier Transform 402. The result therefrom is passed to Matched Filter 404 and Stolt Interpolation 406. The results of Stolt interpolation 406 are range compressed in Range Compression 408 followed Azimuth Deskew 410. The output of Azimuth Deskew 410 is presented to Image Restoration and Auto Focus 412, further detailed within this disclosure. The results form Image Restoration and Auto Focus are processed in 1D FFT (Azimuth) 414 to generate the complex numbers describing the image compiled from the radar returns.

FIG. 5 summarizes Image Restoration and Autofocus 412 from FIG. 4. applicable to the interrupt interpolation (gap filling) method described herein. Complex numbers received from Azimuth Deskew 410 are processed in Low Order Autofocus 501. These low order quantities are used in Gap Interpolation Using Burg Algorithm 503, as further described in FIG. 6 below. The results of the interpolation are used in High Order Autofocus 505 prior to image formation.

The Gap Interpolation Using Burg Algorithm

Figure 6:
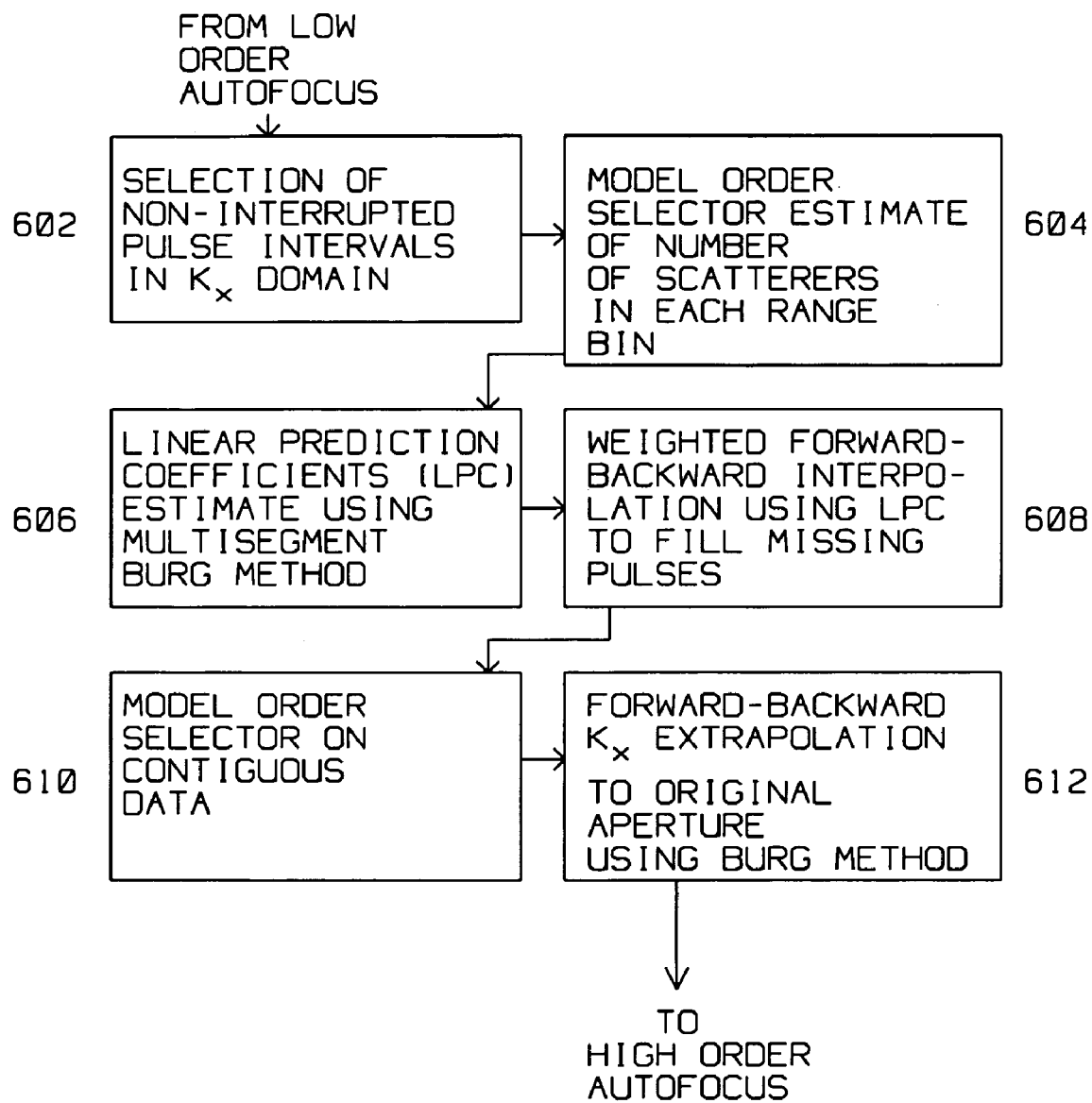
FIG. 6 shows detailed steps of the interrupt interpolation method described herein.

An interrupt in the expected sequence of pulses creates a gap that is filled by using gap interpolation in accordance with this disclosure, as shown in FIG. 6. Gap interpolation is applied independently to each range cell. As shown in FIG. 6, the image data from low order autofocus is presented to Selection of Non-Interrupted pulse intervals in the $K_x$ domain 602. This selects the set of contiguous (uninterrupted) samples (a subset of the SAR array) to be used by the algorithm. Presented with the selected samples to be considered, Model Order Selector Estimate of Number of Scatterers in Each Range Bin 604 estimates an appropriate number of scatterers in each range bin (cell) based on the cumulative FFT power spectrum of each uninterrupted interval of samples. The number of scatterers is selected as the number of peaks of the power spectrums above a certain threshold. This number is increased by about 20% to compensate for the lack of resolution of the FFT.

In Linear Prediction Coefficients (LPC) Estimate Using Multisegment Burg Method 606, the multi-segment BURG algorithm is applied to the intervals selected in 602 to yield a set of linear prediction coefficients (LPC). The number of LPC is given by the selected model order. The BURG algorithm estimates these coefficients to provide stable prediction both in forward and backward directions. The BURG algorithm is described in *Maximum Entropy Spectral Analysis* Ph. D. dissertation, Burg, J. P., Department of Geo Physics, Stanford University, Stanford, Calif., 1975, incorporated herein in its entirety by reference. Further details of the BURG algorithm are described in Chapter 7 of *Digital Spectral Analysis* by S. L. Marple, 1987, Prentice Hall, Englewood Cliffs, N.J., incorporated herein in its entirety by reference.

Weighted Forward-Backward Interpolation Using LPC to Fill Missing Pulses 608 selects the intervals of continuous data surrounding a continuous interval of missing samples and uses linear prediction to fill the missing samples. Using the interval on the right, apply backward linear prediction and predict the missing values. Simultaneously, using the interval on the left, apply forward linear prediction to get estimates of the missing samples. To strengthen the accuracy of the estimation procedure, use the weighted average of the forward and backward prediction as a final estimate of the missing data. The weight is linearly increasing from 0 to 1 and depends on the separation of the missing sample from the two intervals of continuous data. Because of thinning property of the outer intervals of non-interrupted samples, this data is not useful. In order to recover the lost aperture in $\tilde{K}_x$, use the BURG algorithm on the inner, newly-gap interpolated samples of the processor space to linearly extrapolate the data forward and backward. To accomplish this, apply Model Order Selector On Contiguous Data 610. This is followed by the operation Forward-Backward $K_x$ Extrapolation to Original Aperture Using Burg Method 612. Once this step is completed, it creates fully populated processor space samples. Now perform the high order autofocus before obtaining the SAR image.

Step by Step Description of Method.

The following is a detailed description of the implementation of the method for gap filling described herein. This expands on the details of the steps in FIG. 6.

Assume the range-compressed radar returns in processor coordinates $\tilde{K}_x$ and range cells $$\{y_m\}_{m=1}^M$$

After the Azimuth deskew operation, align the interrupts in $\tilde{K}_X$.

The pulse interrupts with respect to the along-track coordinate x start at $x_1, \ldots, x_K$ with corresponding duration $\Delta x_1 \ldots, \Delta X_K$.

Determine the effect of the pulse interruptions on the rotated spatial frequency coordinate: $\tilde{K}_X(Az)$ Use the equation, derived from an expression for the envelope of a single scatterer in $\tilde{K}_X, \tilde{K}_Y$ coordinates:

$$\tilde{K}_{X_i} = -\frac{\sin\overline{\phi}(x_i + \cos\overline{\phi}y_{st})}{R_s + y_{st}}\tilde{K}_Y$$

$\overline{\phi}$=Doppler cone angle at center of aperture
$R_s$=distance from aperture center to scene center
$y_{st}$=range-cell of target in range–Az orientation axes centered at scene center The effect of the interrupts on $\tilde{K}_X$ extends from $$\tilde{K}_{X_i,start} = -\frac{\sin\overline{\phi}(x_i + \cos\overline{\phi}y_{st})}{R_s + y_{st}}\tilde{K}_{Y,low}$$

to $$\tilde{K}_{X_i,end} = -\frac{\sin\overline{\phi}(x_i + \cos\overline{\phi}y_{st})}{R_s + y_{st}}\tilde{K}_{Y,high}$$

$k=1, \ldots, K$

Since an interrupt starts at $x=x_i$ and lasts until $x=x_i+\Delta x_i$ its effects will extend from $$\tilde{K}_{X_i,start} = -\frac{\sin\overline{\phi}(x_i + \cos\overline{\phi}y_{st})}{R_s + y_{st}}\tilde{K}_{Y,low}$$

to $$\tilde{K}_{X_i+\Delta x_i,end} = -\frac{\sin\overline{\phi}(x_i + \Delta x_i + \cos\overline{\phi}y_{st})}{R_s + y_{st}}\tilde{K}_{Y,high}$$

Consider now a sampling of $\tilde{K}_X$, say $\tilde{K}_X(n)$; $n=1, \ldots, N$
Find indices $n_{1,start}, n_{1,end}, \ldots, n_{K,start}, n_{K,end}$ such that $\tilde{K}_X(n_{k,start}) < \tilde{K}_{X_k,start} < \tilde{K}_X(n_{k,start}+1)$ and $\tilde{K}_X(n_{k,end}-1) < \tilde{K}_{X_k,end} < \tilde{K}_X(n_{k,end})$ $k=1, \ldots, K$ (k is the index of the interrupts)
This computed uninterrupted sampled segments $Seg_{k+1}=[\tilde{K}_X(n_{k,end}), \tilde{K}_X(n_{k+1,start})]; k=1, \ldots K-1$ and also the begin and end segments, when available, $Seg_1=[\tilde{K}_X(1), \tilde{K}_X(n_{1,start})]$, $Seg_{K+1}=[\tilde{K}_X(n_{K,end}), \tilde{K}_X(N)]$;

Call the interrupted segments $\{Int_k\}_{k=1}^K$. Each one has $NIP_k$ points, where $NIP_k=n_{k,end}-n_{k,start}$ Note that the segments are dependent on the target range-cell $y_{st}$.

Model order Selection (depends on target range coordinate $y_{st}$)

Use the larger segments to obtain an estimate on the number of scatterers represented in the uninterrupted segments.

1. Find the segment $Seg_k$ containing the largest number of samples, say $k_{max}$
2. Include segments whose number of points are within 50% of $k_{max}$
3. Index all the above segments by: $\{Seg_{k_m}\}_{m=1}^M$; M=total segments
4. Compute the FFT $S_{k_m}$ of size $L=2^{nextpower2(k_{max})}$ of s on the segments $\{Seg_{k_m}\}_{m=1}^M$
5. Compute the power spectral density:

$$P = \sum_{k_m}|S_{k_m}|^2$$

6. Find the noise floor of P:
7. Sort P from small to big; call sorted P:$P_{sort}$
8.

$$\text{Compute noise floor} = \frac{3}{L}\sum_{l=1}^{L/3} P_{sort}(l)$$

9. Peaks are determined from: $\{P(l)|\{P(l-1)<P(l)\}\cap\{P(l+1)<P(l)\}\}_{l=1}^L$ 10. Find the number $L_{thresh}$ of local maxima (peaks) of P that exceed the noise floor by 5 dB 11. Set the model order to: MO=round($1.2L_{thresh}$)

Computation of linear prediction coefficients (depend on range-cell of target $y_m$)

Next we build equations for a linear prediction model to fill up the interrupts (gaps) in the $\tilde{K}_X$ axis. This linear prediction model is the Burg algorithm and we use its multi-segment version. That means we are going to average the signal s over the segments of data $Seg_k$ as follows:

1. Use segment $Seg_1$, only if MO<$n_{1,start}$
2. Use segment $Seg_{K+1}$, only if MO<N–$n_{K,end}$
3. For k=1, . . . , K–1 use $Seg_k$ only if MO<($n_{k+1,start}$–$n_{k,end}$)
4. The new set of segments of data to be used in Burg's algorithm is smaller than the original one and is labeled by indices:

$\{k_i\}_{i=1}^{I}$ and it is a subset of the indices from 1 to K+1

I<K+1

I=total number of usable uninterrupted data segments

5. Initialization:

$\hat{e}_{0,n,k_i}^{f} = s_{n,k_i,m}$ (samples at $k_i$ segment at $m^{th}$ range cell)

$\hat{e}_{0,n,k_i}^{b} = s_{n,k_i,m}$ i=1, . . . , I; n=1, . . . , $N_{k_i}$ $$\hat{\rho}_0 = \frac{1}{\sum_{i=1}^{I}(N_{k_i})} \sum_{i=1}^{I} \sum_{n=1}^{N_{k_i}} |s_{n,k_i,m}|^2$$

$N_{k_1} = n_{k_1+1,start} - n_{k_1,end} + 1$; (# of samples in $Seg_{k_i}$)

6. Computation of reflection coefficients
for μ=1, . . . , MO $$\hat{k}_\mu = -\frac{2\sum_{i=1}^{I}\sum_{n=\mu+1}^{N_{k_i}} \hat{e}_{\mu-1,n,k_i}^{f} \hat{\bar{e}}_{\mu-1,n-1,k_i}^{b}}{\sum_{i=1}^{I}\sum_{n=\mu+1}^{N_{k_i}} \left(|\hat{e}_{\mu-1,n,k_i}^{f}|^2 + |\hat{\bar{e}}_{\mu-1,n-1,k_i}^{b}|^2\right)}$$

Update $\hat{\rho}_\mu = (1-|\hat{k}_\mu|^2)\hat{\rho}_{\mu-1}$;

$\hat{a}_{\mu,\mu} = \hat{k}_\mu$; $\hat{a}_{\mu,j} = \hat{a}_{\mu-1,j} + \hat{k}_\mu \hat{a}_{\mu-1,\mu-j}$; for j=1, . . . ,μ–1

$\hat{e}_{\mu,n,k_i}^{f} = \hat{e}_{\mu-1,n,k_i}^{f} + \hat{k}_\mu \hat{e}_{\mu-1,n-1,k}^{f}$; $\hat{e}_{\mu,n-1,k_i}^{b} = \hat{e}_{\mu-1,n-2,k_i}^{b} + \hat{k}_\mu \hat{e}_{\mu-1,n-1,k_i}^{f}$ μ+1≤N≤$n_{k_i}$; 1≤i≤I 7. The linear prediction coefficients are:

$\hat{a}_j = \hat{a}_{MO,j}$; j=1, . . . , MO

8. Linear prediction used to fill gaps in data
a. Forward Linear Prediction:

$$s_{n,k_i,m} = -\sum_{j=1}^{MO} \hat{a}_j s_{n-j,k_i,m}$$

b. Backward Linear Prediction:

$$s_{n-MO,k_i,m} = -\sum_{j=1}^{MO} \hat{\bar{a}}_j s_{n+j-MO,k_i,m}$$

9. Gap filling procedure per/segment and for every range cell
a. Interrupt segment $Int_{k_i}$, 1≤i≤I
Use segments of uninterrupted data $Seg_{k_i}$, and $Seg_{k_i+1}$
For n=1, . . . , $NIP_k$ fill the gaps recursively by $$s_{n+N_{k_i},k_i,m} = -\sum_{j=1}^{MO} \hat{a}_j s_{n+N_{k_i}-j,k_i,m}$$

$$s_{1-n,k_i+1,m} = -\sum_{j=1}^{MO} \hat{\bar{a}}_j s_{1+j-n,k_i+1,m}$$

The final linear predictor on the gaps is the weighted average of the forward and backward predictors $$\hat{s}_{n,k_i,m} = \frac{n}{NIP_{k_i}} s_{n+N_{k_i},k_i,m} + \frac{NIP_{k_i}-n}{NIP_{k_i}} s_{n-NIP_{k_i},k_i+1,m}$$

$n = 1, \ldots, NIP_{k_i}$

10. Computation of the aperture extrapolation coefficient

Aperture extrapolation is needed to restore the original sample aperture length.

The original sampling in $\tilde{K}_X$ extends from 1 to N.
Find Min{k} such that the length of the uninterrupted data in $Seg_k$ satisfies $n_{k,start} - n_{k-1,end} + 1 > MO (k \geq 2)$.

Say k=$k_{min}$ is the solution.
Also find Max{k} such that:

$n_{k,start} - n_{k-1,end} + 1 > MO(k<K+1)$.

Call the solution k=$k_{max}$.
Now from the previous steps we have filled the interrupts in the $\tilde{K}_X$ sampling space from:

$\tilde{K}_X(n_{k_{min}-1,end})$ to $\tilde{K}_X(n_{k_{max},start})$

We have: $n_{k_{max},start} - n_{k_{min}-1,end} + 2$ non-interrupted samples
The extrapolation ratio is found by solving the equation $$2\alpha = \frac{N - \lfloor n_{k_{max},start} - n_{k_{min}-1,end} + 2 \rfloor}{N}.$$

Then extrapolate uninterrupted data by floor(αN) samples both forward and backward to maintain the same aperture length as the non-interrupted samples. This is done by the BURG algorithm on each range cell. The steps for the model order selection, LPC computation and the missing pulse extrapolation follow the same equations as before except there is only 1 segment of uninterrupted data: $\tilde{K}_X(n_{k_{min}-1,end})$ to $\tilde{K}_X(n_{k_{max},start})$.

All references cited in this document are incorporated herein in their entirety by reference.

Although presented in exemplary fashion employing specific embodiments, the disclosed structures are not intended to be so limited. For example, although the optimization herein is described in the context of a radar system, it is also applicable for sonar, or similar imaging methods, where an image of scatterers is extracted from coherent summing of a plurality of phase accurate returns where the information in one or more returns is missing.

Those skilled in the art will also appreciate that numerous changes and modifications could be made to the embodiment described herein without departing in any way from the invention.

The invention claimed is:

1. A radar for generating a synthetic aperture image from an incomplete sequence of periodic pulse returns, said incomplete sequence of periodic pulse returns having one or more missing pulses, said image containing scatterers, said radar comprising:
    an analog to digital converter for converting said incomplete sequence of pulse returns into a digital stream;
    a computer for processing said digital stream by computing:
    an along track Fourier transform to obtain a first result;
    a range compression using said first result to obtain a second result;
    an azimuth deskew using said second result to obtain a third result; and
    an image restoration and auto focus using said third result to obtain said synthetic aperture image, said image restoration and autofocus computing a low order autofocus, a gap interpolation using a Burg algorithm and a high order autofocus thereby generating an interpolated sequence wherein said interpolated sequence has a complete sequence of periodic pulse returns with uniform spacing for generating said synthetic aperture image.

2. A radar system as described in claim 1 wherein said gap interpolation using a Burg algorithm computes:
    a selection of non-interrupted pulse intervals,
    a model order selector estimate of number of said scatterers,
    a linear prediction coefficients estimate,
    a weighted forward-backward interpolation using said linear prediction coefficients estimate,
    a model order selector and
    a Forward-Backward extrapolation.

3. A radar system as described in claim 2 wherein said linear prediction coefficients estimate is used to compute a weighted forward-backward interpolation to generate said complete sequence of periodic pulse returns.

4. A radar system as described in claim 1 wherein said image restoration and autofocus computes a selection of non-interrupted pulse intervals.

5. A radar system as described in claim 1 wherein said image restoration and autofocus computes a model order selector estimate of number of said scatterers.

6. A radar system as described in claim 1 wherein said image restoration and autofocus computes a linear prediction coefficients estimate using said Burg Algorithm.

7. A method for generating a synthetic aperture image using a radar from an incomplete sequence of periodic pulse returns, said incomplete sequence of periodic pulse returns having one or more missing pulses, said image containing scatterers, said method comprising the steps of:
    converting said incomplete sequence of pulse returns into a digital stream;
    computing an along track Fourier transform to obtain a first result;
    computing a range compression using said first result to obtain a second result;
    computing an azimuth deskew using said second result to obtain a third result; and
    computing an image restoration and auto focus using said third result to obtain said synthetic aperture image,
    said image restoration and autofocus step computing a low order autofocus, a gap interpolation using a Burg algorithm and a high order autofocus thereby generating an interpolated sequence wherein said interpolated sequence has a complete sequence of periodic pulse returns with uniform spacing for generating said synthetic aperture image.

8. A method as described in claim 7 wherein said gap interpolation using a Burg algorithm step computes:
    a selection of non-interrupted pulse intervals,
    a model order selector estimate of number of said scatterers,
    a linear prediction coefficients estimate,
    a weighted forward-backward interpolation using said linear prediction coefficients estimate,
    a model order selector and
    a Forward-Backward extrapolation.

9. A method as described in claim 8 wherein said image restoration and autofocus computes a model order selector estimate of number of said scatterers.

10. A method as described in claim 8 wherein said linear prediction coefficients estimate is used to compute a weighted forward-backward interpolation to generate said complete sequence of periodic pulse returns.

11. A method as described in claim 7 wherein said image restoration and auto-focus computes a selection of non-interrupted pulse intervals.

12. A method as described in claim 7 wherein said image restoration and autofocus computes a linear prediction coefficients estimate using said Burg Algorithm.

* * * * *